(12) United States Patent
Kim

(10) Patent No.: US 12,464,107 B2
(45) Date of Patent: Nov. 4, 2025

(54) STEREOSCOPIC SCREEN DEVICE HAVING EACH PIXEL CONFIGURED TO PROTRACT/RETRACT AND METHOD FOR CONTROLLING SAME

(71) Applicant: Bongjun Kim, Busan (KR)

(72) Inventor: Bongjun Kim, Busan (KR)

(*) Notice: Subject to any disclaimer, the term of this patent is extended or adjusted under 35 U.S.C. 154(b) by 97 days.

(21) Appl. No.: 18/275,810

(22) PCT Filed: Mar. 16, 2022

(86) PCT No.: PCT/KR2022/095055
§ 371 (c)(1),
(2) Date: Aug. 4, 2023

(87) PCT Pub. No.: WO2022/197171
PCT Pub. Date: Sep. 22, 2022

(65) Prior Publication Data
US 2024/0098241 A1 Mar. 21, 2024

(30) Foreign Application Priority Data

Mar. 18, 2021 (KR) .......................... 10-2021-0035530
Mar. 18, 2021 (KR) .......................... 10-2021-0096643

(51) Int. Cl.
*G09G 3/00* (2006.01)
*G09G 3/32* (2016.01)
(Continued)

(52) U.S. Cl.
CPC .............. *H04N 13/32* (2018.05); *G09G 3/007* (2013.01); *G09G 3/32* (2013.01); *G09G 3/3607* (2013.01); *H04N 13/398* (2018.05)

(58) Field of Classification Search
CPC ................................................. G02B 27/0172
See application file for complete search history.

(56) References Cited

U.S. PATENT DOCUMENTS 5,844,530 A * 12/1998 Tosaki ............... G02B 27/0172
345/7
7,852,285 B2 * 12/2010 Tennagels ................ G09F 9/30
345/1.3
(Continued)

FOREIGN PATENT DOCUMENTS

JP  2009-204711 A  9/2009
KR  10-2003-0039142 A  5/2003
(Continued)

OTHER PUBLICATIONS

International Search Report of PCT/KR2022/095055 published on Sep. 22, 2022.
Written opinion of PCT/KR2022/095055 published on Sep. 22, 2022.

*Primary Examiner* — Nan-Ying Yang

(57) ABSTRACT

The purpose of the present invention is to provide a stereoscopic screen device having each pixel configured to protract/retract and method for controlling same, wherein stereoscopic information can be provided. Particularly, the present invention comprises: a fixed housing portion 100 coupled to a mainboard 10 having multiple slots 12 formed thereon, thereby forming each pixel cell of a stereoscopic screen, the fixed housing portion 100 containing a straight driving module 120, PCBs 112 mounted in the slots 12, and a distance sensing module 130; a protracting/retracting housing portion 200 installed to surround the fixed housing portion 100, coupled to the straight driving module 120 and moved accordingly, and configured to detect a distance of movement by the distance sensing module 130; and a visual information output portion 300 configured to output color data transmitted from a computer to the upper area of the protracting/retracting housing portion 200. The stereoscopic screen device having each pixel configured to protract/retract and a method for controlling same, if used, are (Continued)

advantageous in that it is possible to effectively provide visual stereoscopic information which is implemented in terms of x, y, and z axes, and which is dynamic, diversified, and stereoscopic, and the fixed housing portion and the protracting/retracting housing portion are modularized and assembled/installed in mainboard slots, thereby facilitating partial maintenance/repair in the case of malfunctions.

12 Claims, 13 Drawing Sheets

(51) Int. Cl.
*G09G 3/36* (2006.01)
*H04N 13/32* (2018.01)
*H04N 13/398* (2018.01)

(56) References Cited

U.S. PATENT DOCUMENTS

| | | | |
|---|---|---|---|
| 2005/0057487 A1* | 3/2005 | Takata | H04N 21/42638 345/102 |
| 2016/0066400 A1* | 3/2016 | Miller | H05F 3/04 378/121 |
| 2019/0039867 A1* | 2/2019 | Urban | B66F 9/02 |
| 2019/0347961 A1* | 11/2019 | Memon | G09B 25/04 |

FOREIGN PATENT DOCUMENTS

| | | |
|---|---|---|
| KR | 10-2010-0080710 A | 7/2010 |
| KR | 10-1366678 B1 | 2/2014 |
| KR | 10-2016-0141369 A | 12/2016 |
| KR | 10-2017-0004317 A | 1/2017 |
| KR | 10-2017-0132440 A | 12/2017 |
| KR | 10-2334400 B1 | 12/2021 |
| WO | 2016190624 | 12/2016 |

* cited by examiner

Motor reverse operation

Protracting/retracting housing lowermost point detection

Motor forward operation

Motor stop (zero point) when detecting uppermost detected piece

STEREOSCOPIC SCREEN DEVICE HAVING EACH PIXEL CONFIGURED TO PROTRACT/RETRACT AND METHOD FOR CONTROLLING SAME

TECHNICAL FIELD

The present disclosure relates to a stereoscopic screen device having a protracting/retracting structure by pixel, and a method for controlling the same, and more specifically, to a stereoscopic screen device having a protracting/retracting structure by pixel, and a method for controlling the same, which can effectively provide visually dynamic, colorful, and stereoscopic information realized in x, y, z-axis coordinates.

BACKGROUND ART

Until now, a 2D display, known as a screen, has been realized by installing pixels on a plane or closed curved surface and transmitting data to the pixels to present information needed by a user.

Here, the 2D display could not accurately show a space expressed in three dimensions (x, y, z) due to the fundamental (physical) limitation of the space expressed in the mathematical x, y coordinates, which is two-dimensional. To overcome the problem, there has been development in computer graphic technology, and the current screen realized by computer graphics has evolved to a point where it's hard to feel any difference from the actual landscape.

However, no matter how much computer graphics have advanced, the display means cannot escape from the 2D medium, known as the screen, and is limited to a 2D expression imitating 3D. An area showing such limitation precisely is calculation of coordinates, vectors, and movements in a space, which are often dealt with in mathematics and engineering. Despite the fact that the objects dealt with in the above examples should exist in three dimension, the currently used expression means are restricted to 2D media such as paper, a screen, or a fixed 3D model. As a result, 3D points, lines, and quantities are currently represented using an auxiliary projection technique for 2D representation, or are described, calculated or expressed by a model manufactured to express a specific phenomenon. In this process, characteristics, such as a size and a direction, of the original quantity or phenomenon are distorted, so it makes difficult to represent and understand information, or only information on a specific moment or state may be obtained from the fixed model.

Korean Patent Publication No. 10-2003-0039142 discloses a display device which includes a display means and a driving means for adjusting a protrusion length of the display means, which are respectively provided to a plurality of cells of a predetermined size constituting a display unit for displaying data, and can represent data three-dimensionally by showing brightness of data allocated to each cells through adjustment of the protrusion length of the display means. The driving means controlling movement of the display unit is actuated by step motors. In a case in which the step motors are installed in hundreds of pixel cells, it is nearly impossible to commercialize the display device due to the parts cost of several tens of millions of won.

As another conventional art, Korean Patent Publication No. 10-2017-0004317 discloses an LED display board displaying colors through LEDs provided by each pixel, comprising: a housing which includes front perforated portions formed along two or more lines at a constant interval in each of longitudinal and transverse directions; a light emitting unit which includes light emitting bars adapted to be transparent or translucent and to be formed in a shape of a three-dimensional bar, LED lamps, lifting and lowering recessions formed in bottoms of the light emitting bars, and lifting and lowering screw connection parts mounted in ends of the lifting and lowering recessions; a lifting and lowering unit which includes lifting and lowering screws in which spiral grooves are formed, lifting and lowering rotation gears adapted to transfer rotational force to the lifting and lowering screws, and lifting and lowering engagement parts adapted to perform a function of lifting or lowering locations of the lifting and lowering screws and the locations of the lifting and lowering rotation gears; a rotation drive unit which includes an electric motor and rotation gears; a control unit which controls information about color of the light emitting unit by using a processor, which controls whether the lifting and lowering engagement parts are engaged by using the processor, and which controls operation of the rotation drive unit by using the processor; and a power supply which supplies power. However, due to the nature of controlling the movement of each lifting and lowering screw by the clutch method using an electromagnet, it is impossible to accurately transfer the light emitting unit, it is also impossible to precisely output a desired stereoscopic image due to the accumulated movement error of the light emitting unit during continuous use, and it is also impossible to show various and complex expressions since input and output are controlled only in one direction at the same time.

SUMMARY OF THE INVENTION

Technical Problem

Accordingly, the present invention has been made in view of the above-mentioned problems occurring in the related art, and it is an object of the present invention to provide a stereoscopic screen device having a protracting/retracting structure by pixel, and a method for controlling the same, which can realize the z-axis coordinate using a plurality of fixed housing portions arranged on the x, y, z-axis coordinate plane to be spaced apart from one another and protracting/retracting housing portions respectively coupled to the fixed housing portions to be movable in a straight line, and show various colors of light to the outside of each protracting/retracting housing portion, thereby effectively providing visually dynamic, colorful, and stereoscopic information realized in x, y, z-axis coordinates.

It is another object of the present invention to provide a stereoscopic screen device having a protracting/retracting structure by pixel, which has the fixed housing portion and the protracting/retracting housing portion which are modularized for economical and convenient maintenance and are assembled and installed in a main board slot.

It is a further object of the present invention to provide a stereoscopic screen device having a protracting/retracting structure by pixel, which can accurately control a protracting/retracting distance by setting start positions of the protracting/retracting housing portions corresponding to pixels to be the same.

Technical Solution

To accomplish the above-mentioned objects, according to the present invention, there is provided a stereoscopic screen device having a protracting/retracting structure by pixel, including: a fixed housing portion which is coupled to a main board having multiple slots to form each pixel cell of a stereoscopic screen, and includes a straight driving module, PCBs mounted in the slots, and a distance sensing module; a protracting/retracting housing portion which is installed to surround the fixed housing portion, moves in coupling with the straight driving module, and is configured to detect a movement distance by the distance sensing module; and a visual information output portion configured to output color data transmitted from a computer to the upper area of the protracting/retracting housing portion.

Moreover, the stereoscopic screen device further includes a control module for controlling the position of the protracting/retracting housing portion by the straight driving module or for controlling the visual information output through the visual information output portion, wherein the control module is installed on the PCB or the main board, and includes a microprocessor, which receives expression information (the movement distance of the protracting/retracting housing portion, color data) from a computer, and a motor driver, which is installed on the PCB and controls the rotation direction of the motor.

Furthermore, the straight driving module includes a gear mount which is installed in the fixed housing portion, a driving gear which rotates by being connected to the axis of the motor, a rack gear which is installed in a longitudinal direction on one side of the protracting/retracting housing portion, and a slave gear which is installed on the gear mount and is engaged between the driving gear and the rack gear.

Additionally, the distance detection module includes a sensor installed in the fixed housing portion and connected to the control module, point-type or line-type detected pieces arranged in a length direction of the protracting/retracting housing portion corresponding to the sensor, and a low-point detection part which detects the lowest height of the protracting/retracting housing portion to initialize the position of the protracting/retracting housing portion as the origin (starting point). The sensor detects the detection signal of the detected piece to detect the movement distance of the protracting/retracting housing portion, and is configured to set the start position of each protracting/retracting housing portion to be the same through the distance detection module.

In addition, the low-point detection part has a switch electrically connected to the control module on the fixed housing portion, and is configured to physically contact the switch when the protracting/retracting housing portion is lowered to the lowest height. Alternatively, the low-point detection part has a second detected piece which is mounted at a lower portion of one side of the protracting/retracting housing portion, and a second sensor which recognizes the second detected piece on the PCB at the position corresponding to the second detected piece when the protracting/retracting housing portion is located at the lowermost position.

Moreover, the visual information output portion is electrically connected to the control module and includes an LED module installed at the end portion of the fixed housing portion which outputs an RGB light source.

Furthermore, the visual information output portion includes at least one LCD panel formed on the protracting/retracting housing portion, a backlight installed within the protracting/retracting housing portion to output a light source toward the LCD panel, a first image control board controlling the LCD panel and the backlight, and a first cable of which one end is connected to the first image control board and the other end is connected to the control module to transmit an image signal and power.

Additionally, the visual information output portion includes at least one OLED/QLED panel formed on the protracting/retracting housing portion, a second image control board installed within the protracting/retracting housing portion to control the OLED/QLED panel, and a second cable of which one end is connected to the second image control board and the other end is connected to the control module to transmit an image signal and power.

In another aspect of the present invention, there is provided a method for controlling a stereoscopic screen device having a protracting/retracting structure by pixel, including: a position initialization step (S10) of setting a zero point (start point) of a protracting/retracting housing portion; a target position data reception step (S20) in which, after setting the zero point of the protracting/retracting housing portion, a microprocessor receives a target position value according to a movement distance of the protracting/retracting housing portion from a computer; a position difference calculation and storage step (S30) of calculating the difference between the target position value and a current position value and storing the calculated value as a movement command value; and a protracting/retracting housing operation step (S40) in which, if the movement command value calculated by the current position and target position values is greater than '0', a motor of the straight driving module operates forward to protract and retract the protracting/retracting housing portion and the motor turns off to stop the movement of the protracting/retracting housing portion when the detection value of the distance detection module matches the moving command value, and if the moving command value is less than '0', the motor of the straight driving module operates in reverse to return and move the protracting/retracting housing portion and the motor turns off to stop the movement of the protracting/retracting housing portion when the detection value of the distance detection module matches the moving command value.

In addition, in the position initialization step (S10), at the timepoint when the control module turns on, the motor operates in reverse to lower the protracting/retracting housing portion, and when the lowest point of the protracting/retracting housing portion is recognized by the low point detection part, the motor operates forward to lift upward the protracting/retracting housing portion, and when the sensor of the distance detection module recognizes the uppermost detected piece, the motor stops to set the starting point of the protracting/retracting housing portion.

Advantageous Effects

By specific means to solve the aforementioned problem, the present invention can provide visual information three-dimensionally on a screen by realize the z-axis coordinate using a plurality of fixed housing portions arranged in x, y, z-axis coordinate planes to be spaced apart from one another and protracting/retracting housing portions respectively coupled to the fixed housing portions to be movable in a straight line, and can provide visual information with dynamic, colorful, and stereoscopic aesthetic sensibility by the protracting/retracting housing portions expressing light of various colors.

Moreover, since the unit module, which is composed of the fixed housing portion and the protracting/retracting housing portion and corresponds to a single pixel, is assembled in the slot of the main board placed on the x, y-axis coordinate plane, and since a PCB, a sensor, and driving devices are provided in the unit module, the present invention is easy to maintain by replacing only the unit module in case of malfunction, and ensure price competitiveness by considerably reducing manufacturing cost.

In addition, the present invention can accurately control the movement distance of the protracting/retracting housing portion by a regular motor, can be utilized in various fields since protracting/retracting displacement can be easily adjusted, and can transfer lots of information through the representation of color and video.

Furthermore, the present invention can provide effective visual information by expressing a stereoscopic sense accurately without pinpoint accuracy since setting the starting positions of the protracting/retracting housings corresponding to pixels to be the same and accurately controlling the movement distance of the protracting/retracting housings.

DETAILED DESCRIPTION OF THE INVENTION

Hereinafter, embodiments of the present disclosure will be described in detail with reference to the accompanying drawings. Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included.

Figure 1:
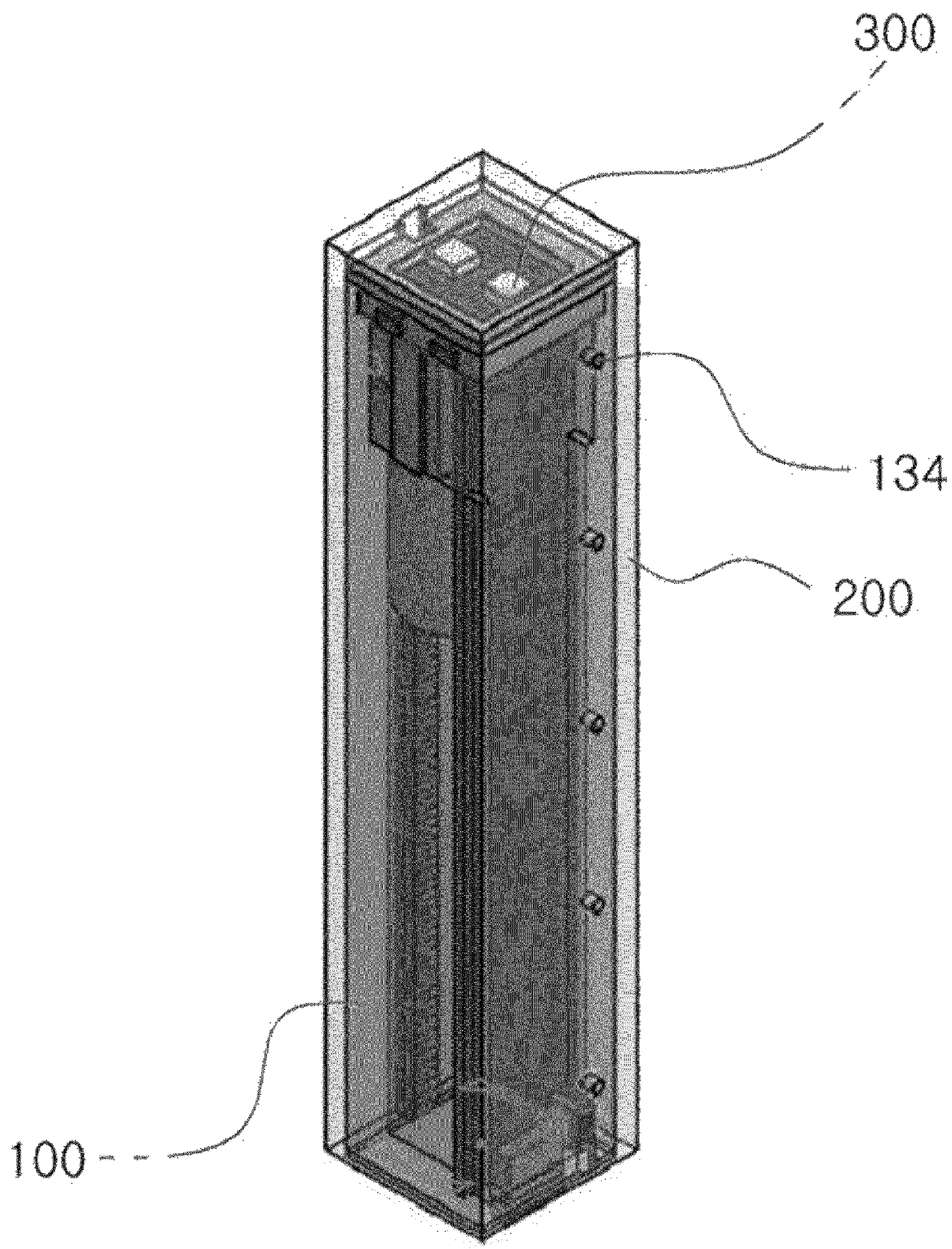
FIG. 1 is a perspective view illustrating a stereoscopic screen device having a protracting/retracting structure by pixel according to a preferred embodiment of the present invention.
Figure 2:
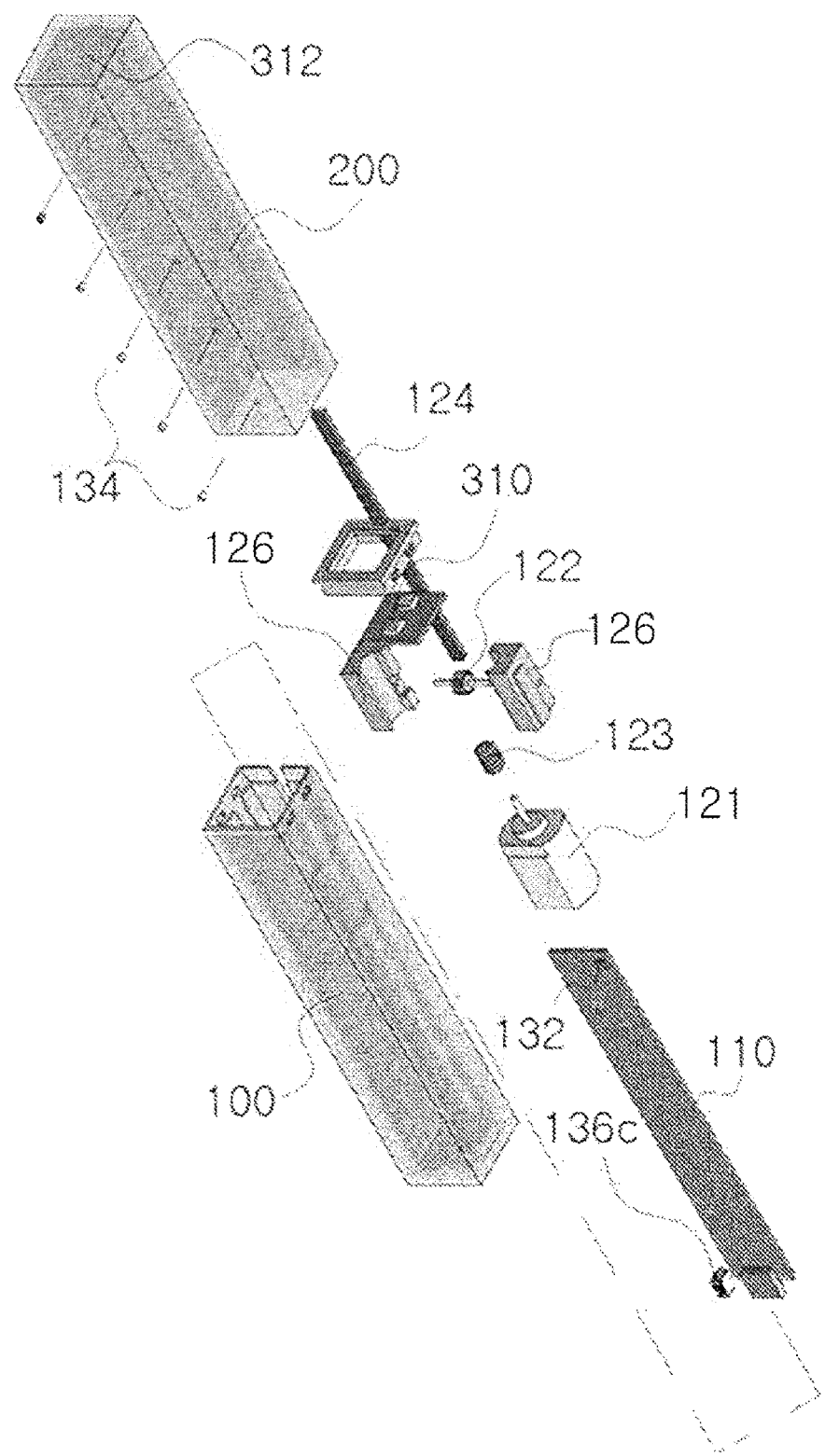
FIG. 2 is an exploded perspective view of FIG. 1.
Figure 3:
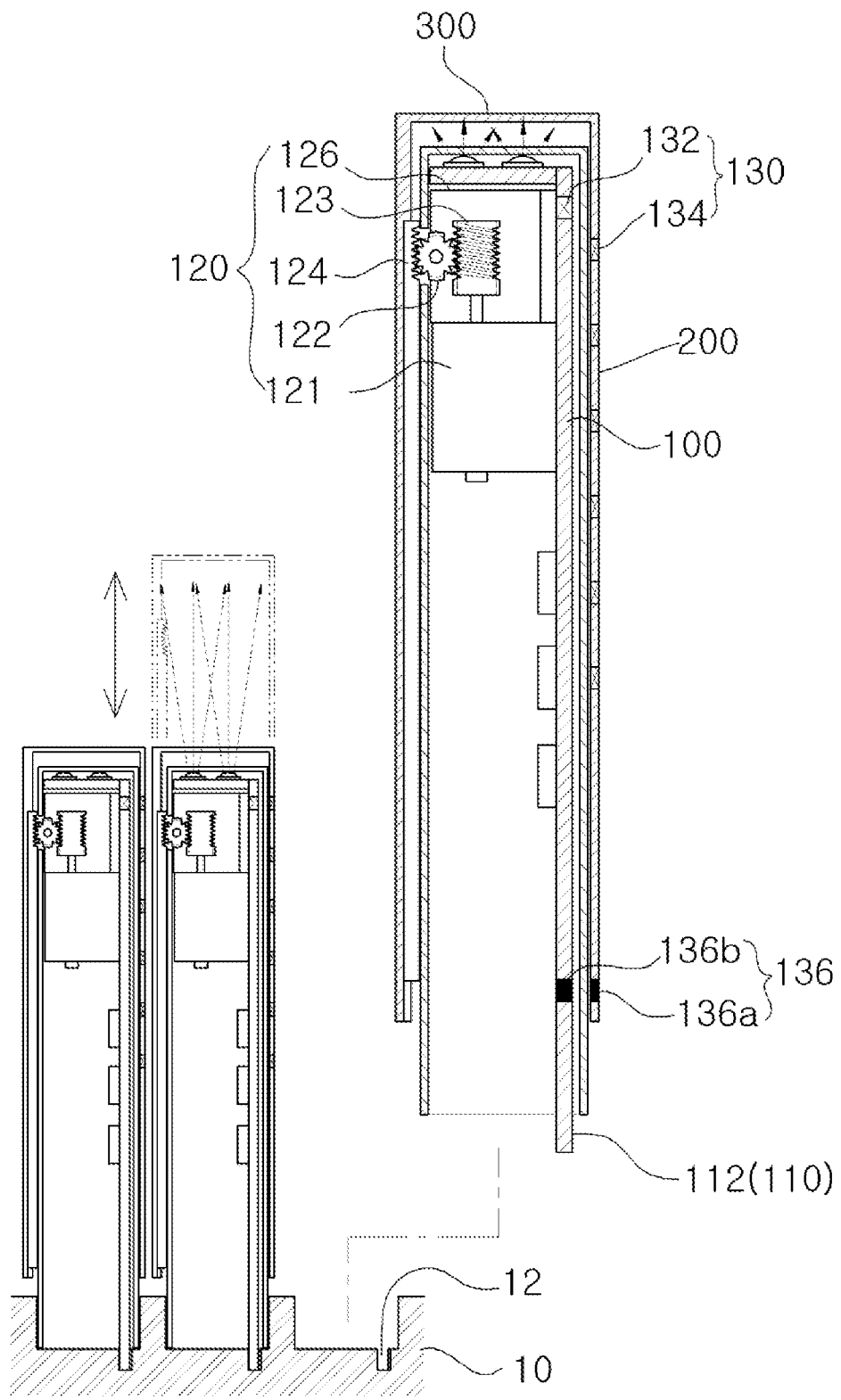
FIG. 3 is a front sectional view of the stereoscopic screen device having a protracting/retracting structure by pixel according to the present invention.

FIG. 1 is a perspective view illustrating a stereoscopic screen device having a protracting/retracting structure by pixel according to a preferred embodiment of the present invention, FIG. 2 is an exploded perspective view of FIG. 1, and FIG. 3 is a front sectional view of the stereoscopic screen device having a protracting/retracting structure by pixel according to the present invention. The present invention relates to a stereoscopic screen device having a protracting/retracting structure by pixel, and a method for controlling the same. The stereoscopic screen device having a protracting/retracting structure by pixel includes fixed housing portions 100, protracting/retracting housing portions 200 which is coupled to the fixed housing portions 100 and can be moved, and a visual information output portion 300. The stereoscopic screen device according to the present invention realizes a z-axis coordinate by a straight movement distance of each protracting/retracting housing portion, realizes x and y-axis coordinates by the protracting/retracting housing portions arranged on a plane to be spaced apart from one another, and shows various colors of light to the outside of each protracting/retracting housing portion, thereby effectively providing visually dynamic, colorful, and stereoscopic information realized in x, y, z-axis coordinates.

First, the fixed housing portion 100 according to the present invention is mounted in a slot 12 of a main board 10, which is arranged on the x, y-coordinate plane, to form each pixel cell in the x and y-axis directions of the stereoscopic screen, and includes a PCB 112, a straight driving module 120, and a distance sensing module 130 provided inside.

The main board 10 includes the multiple slots 12 for installing the fixed housing portion 100, corresponding to each pixel cell on the x, y-axis coordinate plane of the stereoscopic screen.

The fixed housing portion 100 is a polygonal or circular tube, of which one end is fitted into the slot 12 of the main board 10, and serves as a guide to support the protracting/retracting housing portion 200, which will be described later, so that the protracting/retracting housing portion 200 can move back and forth linearly on the fixed housing portion 100.

The main board 10, to which the fixed housing portion 100 is coupled, can be formed as a single body corresponding to the entire screen plane size (x, y-axis) or be standardized to a predetermined size and assembled into a desired size.

The stereoscopic screen device of the present invention includes a control module 110 which controls the position of the protracting/retracting housing portion 200 by the straight driving module 120 or controls the visual information output through the visual information output portion 300.

The control module 110 is installed on the main board 10 or the PCB 112, and includes a microprocessor that receives expression information from a computer (smartphone), a motor driver having an H-bridge circuit mounted therein to control a rotation direction of the motor, and the PCB 112. The control module receives the expression information from the computer, and controls the position of the protracting/retracting housing portion 200 by the straight driving module 120 and the visual information output through the visual information output portion 300.

The expression information means information that can be visually recognized when a person looks at the stereoscopic screen device of the present invention, and specifically contains one or more of the movement distance of the protracting/retracting housing portion 200, color data displayed outside the protracting/retracting housing portion 200, and video data displayed outside the protracting/retracting housing portion 200.

The PCB 112 is installed inside the fixed housing portion 100, forms a terminal that protrudes longer than the fixed housing portion 100 at one end, and the terminal is grounded to the slot 12 of the main board 10 to receive a control signal and power.

Figure 9:
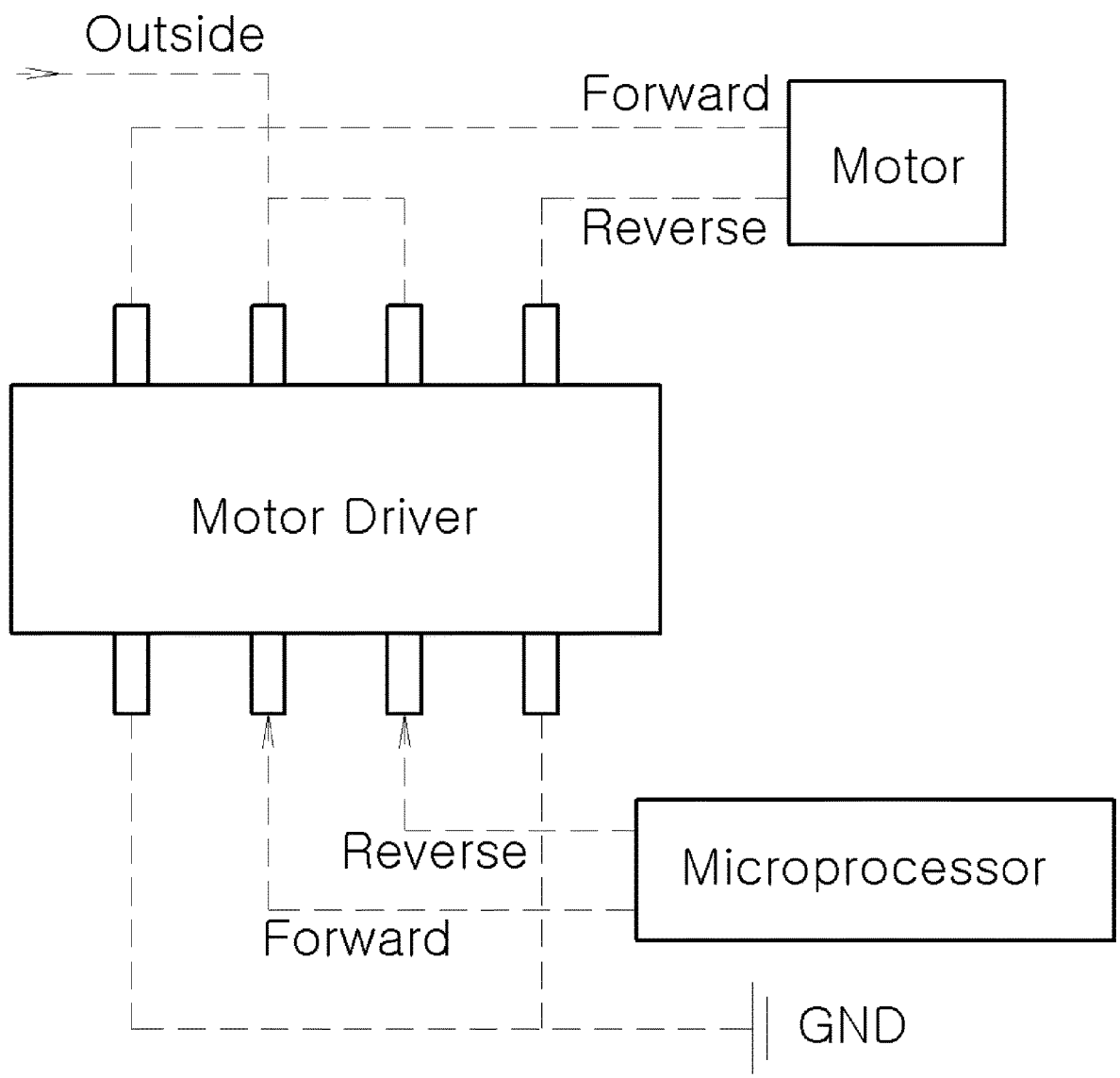
FIG. 9 is a configuration view showing a forward and reverse driving method of a motor by a control module of the stereoscopic screen device according to another embodiment of the present invention.

Moreover, the microprocessor receives and processes (calculates, controls) the expression information provided by the computer through wired and wireless communication, and the motor driver receives a signal from the microprocessor as illustrated in FIG. 9 to control the forward/reverse drive and the on/off operation of the motor 121 in the straight driving module 120, thus controlling the movement of the protracting/retracting housing portion 200.

Figure 4:
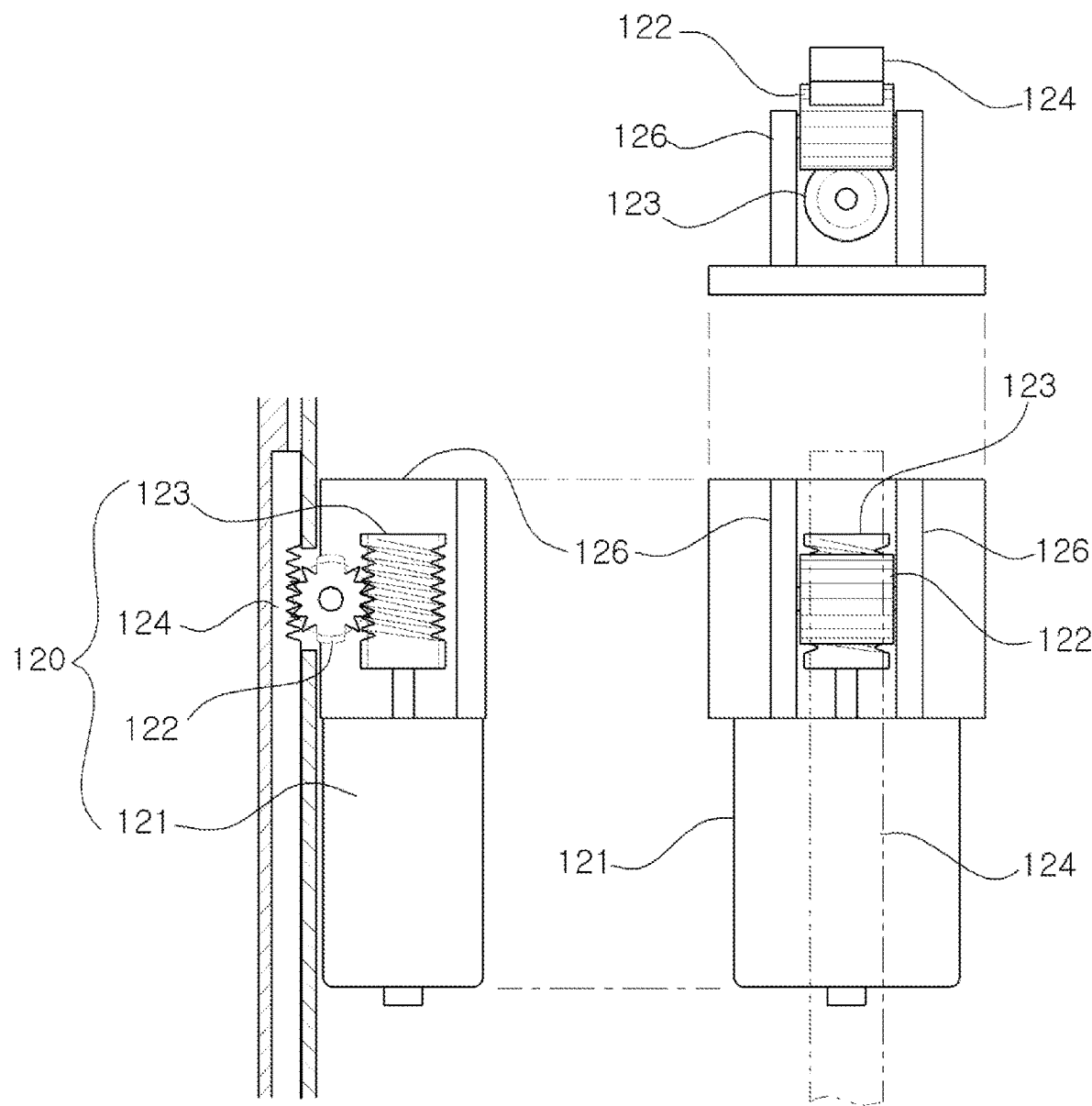
FIG. 4 is a configuration view illustrating a straight driving module of the stereoscopic screen device having a protracting/retracting structure by pixel.

FIG. 4 is a configuration view illustrating a straight driving module of the stereoscopic screen device having a protracting/retracting structure by pixel. The straight driving module 120 includes a gear mount 126 which is installed in the fixed housing portion 100, a driving gear 123 which rotates by being connected to the axis of the motor 121, a rack gear 124 which is installed in a longitudinal direction on one side of the protracting/retracting housing portion 200, and a slave gear 122 which is engaged between the driving gear 123 and the rack gear 124.

The gear mount 126 is provided to rotatably mount both ends of the slave gear 122 to convert the rotational drive power of the motor 121 into a linear motion at an appropriate speed, and may be mounted inside the fixed housing portion 100 or on the PCB of the control module 110.

As described above, a simple gear assembly in which driving force of the motor 121 is transmitted to the slave gear 122 via the driving gear 123 can provide a large reduction ratio, realize miniaturization and weight-lightening, and prevent reverse rotation, such that the z-direction position of the protracting/retracting housing portion 200, which is connected to the rack gear 124, does not vary and remains fixed in place.

In this instance, the movement distance of the protracting/retracting housing portion 200 is detected by the distance sensing module 130, and the on/off operation of the motor 121 is controlled based on a detection value of the distance sensing module 130.

Figure 5:
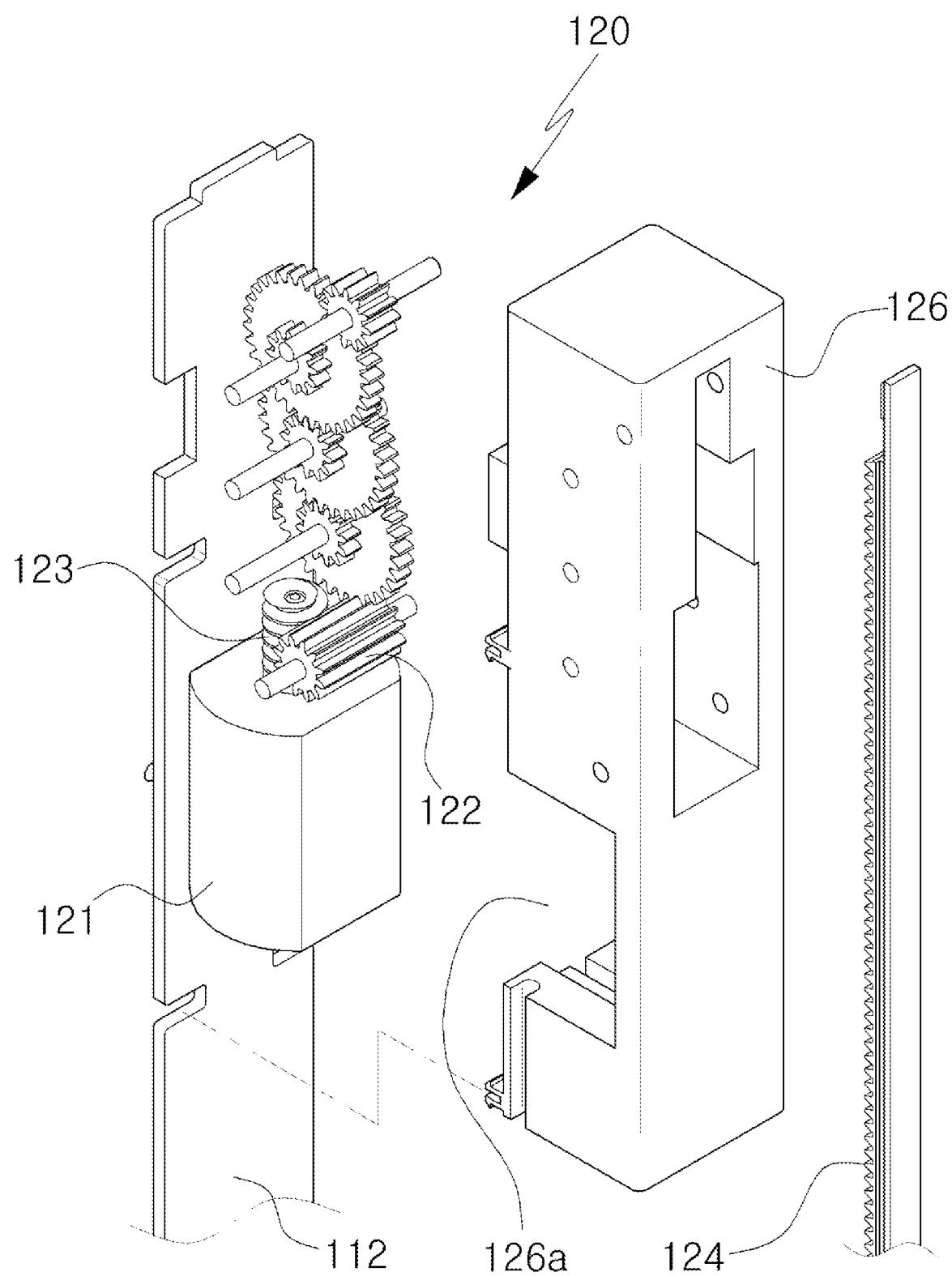
FIG. 5 is a configuration view illustrating a gear mount of a stereoscopic screen device according to another embodiment of the present invention.

FIG. 5 is a configuration view illustrating a gear mount of a stereoscopic screen device according to another embodiment of the present invention. As illustrated in the drawing, the gear mount 126 can be detachably coupled to the PCB, and has a shape corresponding to an internal installation space of the fixed housing portion 100 in order to reinforce strength of the fixed housing portion 100.

The multiple slave gears 122 are installed in the gear mount 126 to control the proper driving speed of the protracting/retracting housing portion 200 using a gear ratio.

Moreover, a recess 126 is formed such that the motor 121 can also be easily inserted to prevent movement during operation, thus providing stable driving stability.

Figure 6:
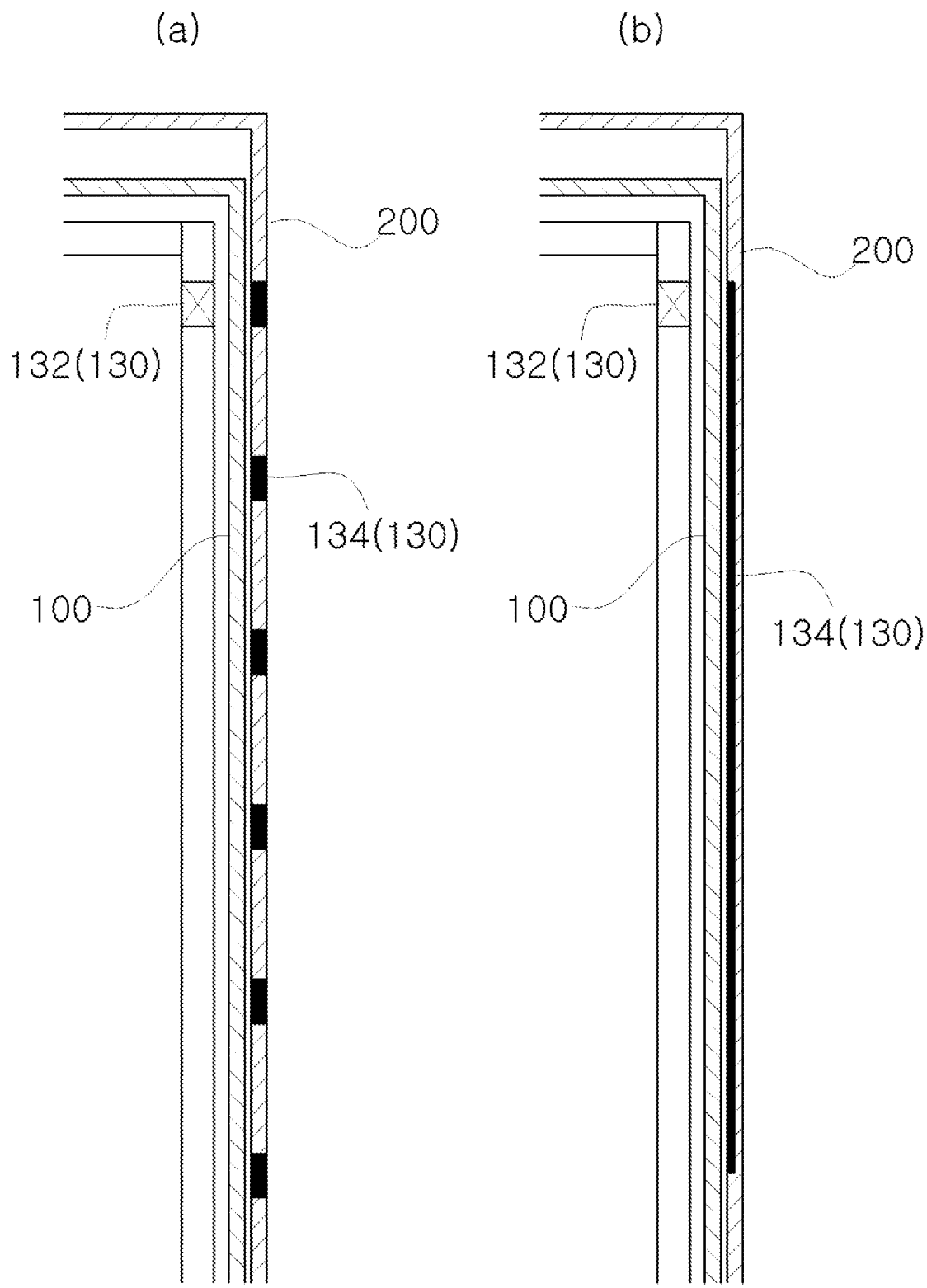
FIG. 6 is a configuration view illustrating a distance sensing module of the stereoscopic screen device according to another embodiment of the present invention.

FIG. 6 is a configuration view illustrating a distance sensing module of the stereoscopic screen device according to another embodiment of the present invention. The distance sensing module 130 includes a sensor 132 which is installed on the fixed housing portion 100 and connected to the control module 110, dot-type or line-type detected pieces 134 which are arranged in the length direction of the protracting/retracting housing portion 200 corresponding to the sensor 132, and a low point detection part 136 which detects the lowest height of the protracting/retracting housing portion 200 to initialize the position of the protracting/retracting housing portion 200 to the origin (starting point).

FIG. 6(a) is a configuration diagram showing the dot-type detected piece 134, wherein the protracting/retracting housing portion 200 has a hole, and the detected pieces 134 having a magnet are arranged in the hole at predetermined intervals. FIG. 6(b) is a configuration diagram showing the line-type detected piece 134, illustrating an example where a magnetic tape is attached to the inner surface of the protracting/retracting housing portion 200.

The low point detection part 136 is a means to detect the lowest height of the protracting/retracting housing portion 200. Referring to FIG. 2, a switch 136c electrically connected to the control module 110 is mounted on the fixed housing portion 100, and the protracting/retracting housing portion 200 comes into physical contact with the switch 136c when lowering to its lowest height so as to recognize the lowest point position.

In another method, referring to FIG. 3, a second detected piece 136a is installed at a lower portion of one side of the protracting/retracting housing portion 200, and a second sensor 136b, which recognizes the second detected piece 136a, can be installed on the PCB of the control module 110 at the location corresponding to the second detected piece 136a in a state in which the protracting/retracting housing portion 200 is in its lowest position.

Meanwhile, the position initialization of the protracting/retracting housing portion 200 signifies placing the position of the protracting/retracting housing portion 200 at zero, or the starting point, just before receiving expression information (movement distance of the protracting/retracting housing portion, color data) from the control module 110. The starting point of the protracting/retracting housing portion 200 is not the lowest point of the protracting/retracting housing portion 200 recognized by the low point detection part 136, but the position at which the sensor 132 of the distance detection module 130 recognizes the uppermost detected piece 134.

Therefore, in order to reduce the recognition error of the detected piece by the sensor 132 and to improve accuracy, as illustrated in FIG. 3, it is desirable to place the sensor 132 of the distance detection module 130 at a higher position in the range where it does not recognize the uppermost detected piece 134 when the protracting/retracting housing portion 200 is at its lowest point.

As described above, through the distance detection module 130, the starting positions of protracting/retracting housing portions 200 are set identically and the movement distance of the corresponding protracting/retracting housing portion 200 is accurately controlled according to the expression information transmitted to the microprocessor.

The protracting/retracting housing portion 200 according to the present invention is installed to enclose the fixed housing portion 100 from above, and is provided such that the protruding length along the fixed housing portion 100 is controlled by the straight driving module 120.

The protracting/retracting housing portion 200 has a cylindrical body which has the same cross-sectional shape as the fixed housing portion 100, and a rack gear 124 which meshes with the slave gear 122 of the straight driving module 120 is installed on one inner surface.

Hence, the protracting/retracting housing portion 200 realizes the z-axis coordinates of the stereoscopic screen as the protracting/retracting distance is controlled along the fixed housing portion 100 by the operation of the straight driving module 120.

As described above, since the unit module, which is composed of the fixed housing portion and the protracting/retracting housing portion and corresponds to a single pixel, is assembled in the slot of the main board placed on the x, y-axis coordinate plane, and since a PCB, a sensor, and driving devices are provided in the unit module, the stereoscopic screen device according to the present invention can provide visually dynamic, colorful, and stereoscopic information.

Moreover, since the control module 110, the straight driving module 120, and the distance detection module 130 are equipped inside the pixel unit module comprised of the protracting/retracting housing portion 200 and fixed housing portion 100, in case of failure or malfunction, only the unit module of the corresponding defective pixel is replaced or repaired, thereby significantly saving time and cost associated with maintenance.

Figure 7:
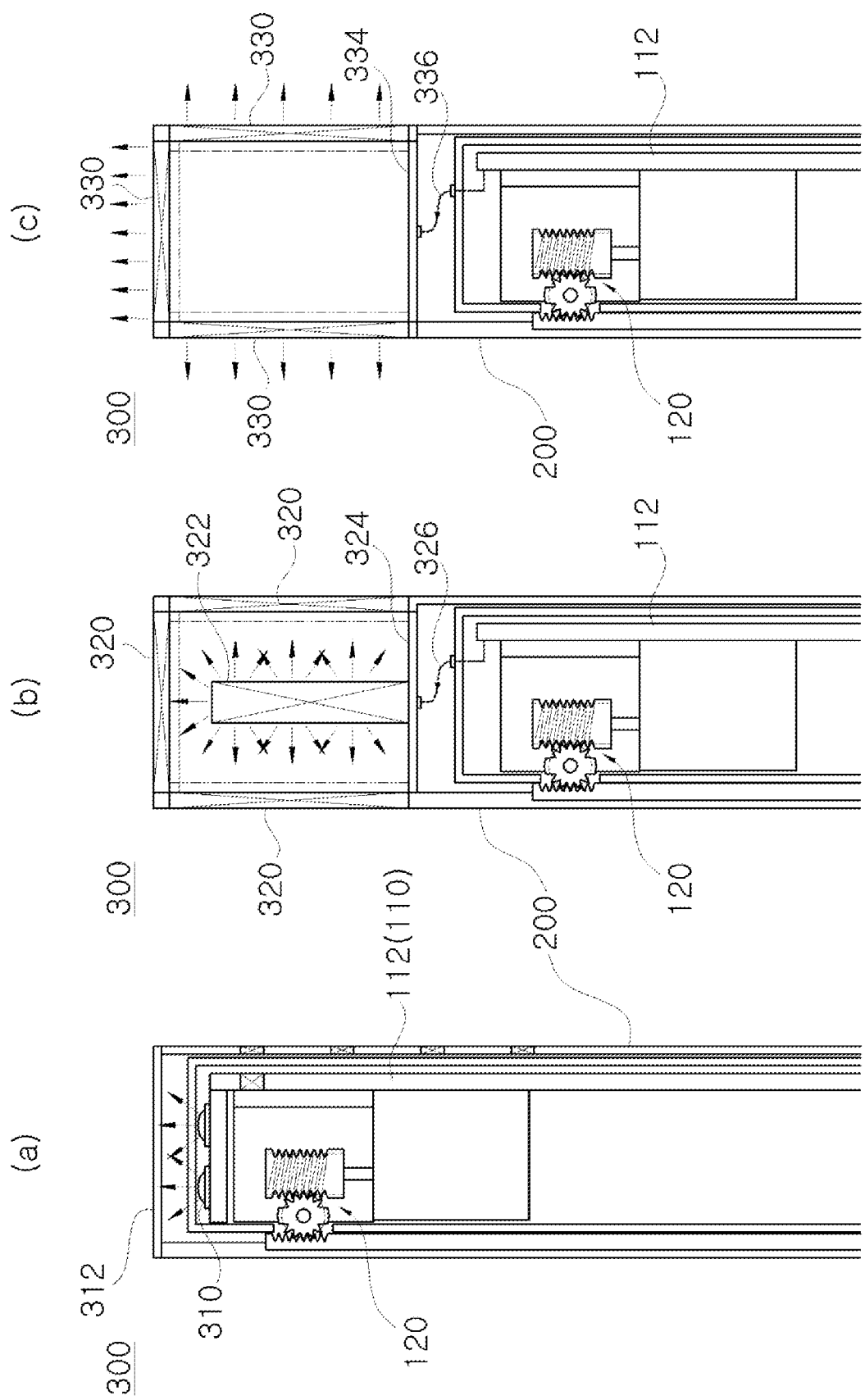
FIG. 7 is a configuration view illustrating a visual information output portion of the stereoscopic screen device according to another embodiment of the present invention.

FIG. 7 is a diagram illustrating a visual information output portion of the stereoscopic screen device according to the present invention. The visual information output portion 300 according to the present invention is provided to output color data of the expression information transmitted from a computer to an upper area of the protracting/retracting housing portion 200 for the purpose of emitting light.

The visual information output portion 300 may be any one of an LED module 310, an LCD panel 320, and an OLED/QLED panel 330 to output light. Here, the LCD panel 320 and the OLED/QLED panel 330 can be collectively referred to as a 'display panel' without being separately distinguished.

Referring to FIG. 7(*a*), the visual information output portion 300 includes an LED module 310 electrically connected to the control module 110 and installed at the end of the fixed housing portion 100 to output RGB light, and if necessary, further includes a diffusion panel 312, which formed in the end area of the protracting/retracting housing portion 200 and is made of a transparent or semi-transparent material to externally display a light source output from the LED module 310 to the outside.

In this instance, the LED module 310, as illustrated, may be fixedly installed at the end of the fixed housing portion 100, and may be installed at the upper portion of the protracting/retracting housing portion 200 to be movable along with the protracting/retracting housing portion 200.

In addition, the diffusion panel 312) as illustrated, may be formed integrally in the end or some upper area of the protracting/retracting housing portion 200.

Referring to FIG. 7(*b*), the visual information output portion 300 includes at least one LCD panel 320 formed at the end area of the protracting/retracting housing portion 200, a backlight 322 installed within the end area of the protracting/retracting housing portion 200 to output a light source toward the LCD panel 320, a first image control board 324 controlling the LCD panel 320 and the backlight 322, and a first cable 326 of which one end is connected to the first image control board 324 and the other end is connected to the control module 110 to transmit an image signal and power.

Here, the backlight 322 protrudes in a pillar shape from the center inside the protracting/retracting housing portion 200 to output a backlight source in all directions.

Referring to FIG. 7(*c*), the visual information output portion 300 includes at least one OLED/QLED panel 330 formed in the end area of the protracting/retracting housing portion 200, a second image control board (332) installed within the end area of the protracting/retracting housing portion 200 to control the OLED/QLED panel 330, and a second cable (334) of which one end is connected to the second image control board 324 and the other end is connected to the control module 110 to transmit an image signal and power.

At this time, the OLED/QLED panel (330) is a general high-quality display panel which does not need a backlight or has a backlight formed integrally in a small size.

Figure 8:
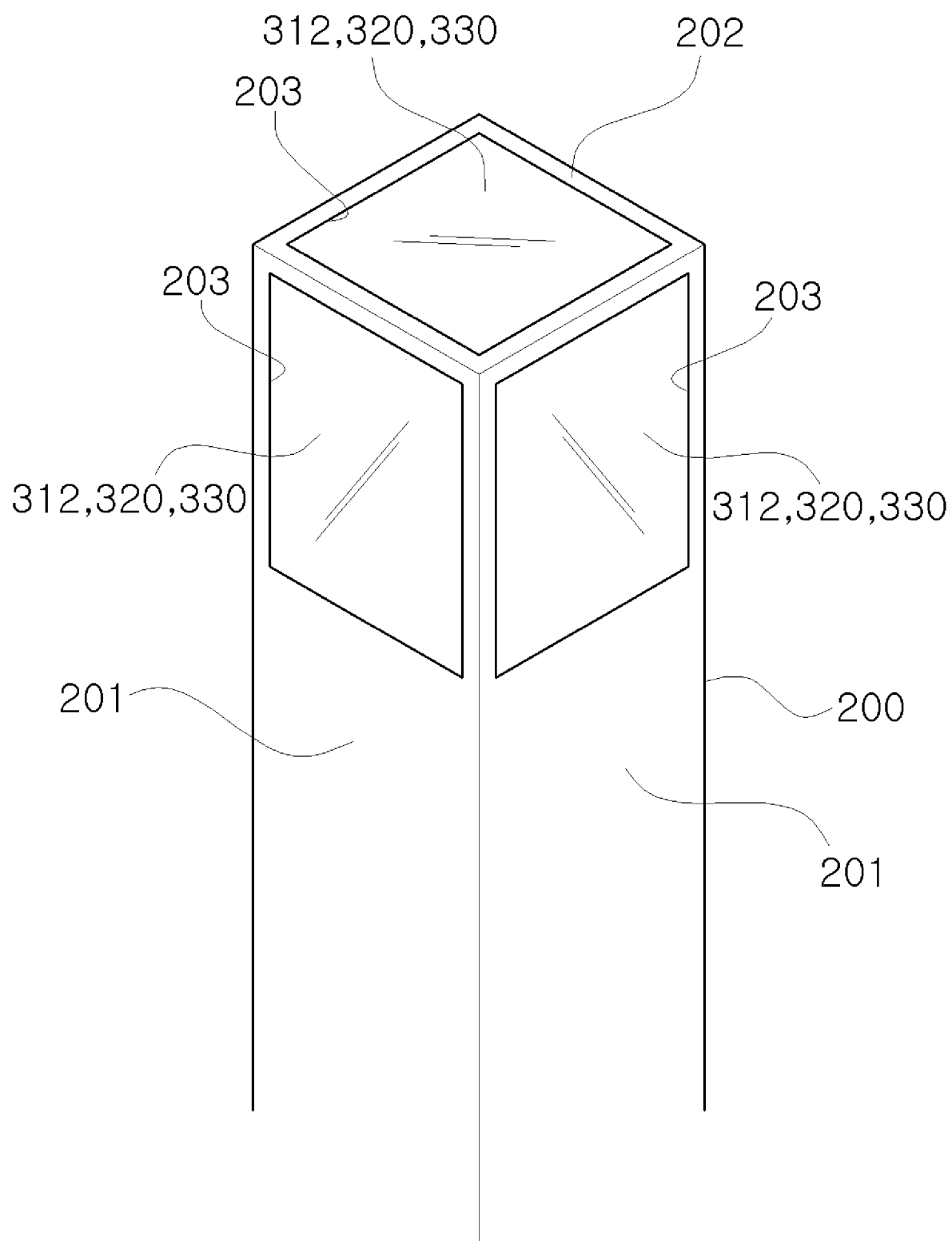
FIG. 8 is a configuration view illustrating a protracting/retracting housing portion of the stereoscopic screen device according to another embodiment of the present invention.

FIG. 8 illustrates a case in which the protracting and contracting housing portion 200 is formed as a rectangular tube. In a case in which the protracting and contracting housing portion 200 is formed as a rectangular tube by combination of four side plates 201, the top of the rectangular tube is finished by a front panel 202, and opening holes 203 are formed in each of the front panel 202 and the side panels 201.

Furthermore, the diffusion panel 312, the LCD panel 320, or the OLED/QLED panel 330 of the visual information output portion 300 is installed in the opening hole 203.

As described above, since the diffusion panels 312 or the display panels (LCD panel, or OLED/QLED panel) are applied to the side plates 201 and the front plates 202 of the protracting and contracting housing portion 200, the present invention can express the light source of various colors through total five places, thereby providing expandability that can output more diverse stereoscopic advertisement patterns without degradation of recognition depending on viewing angles.

Figure 10:
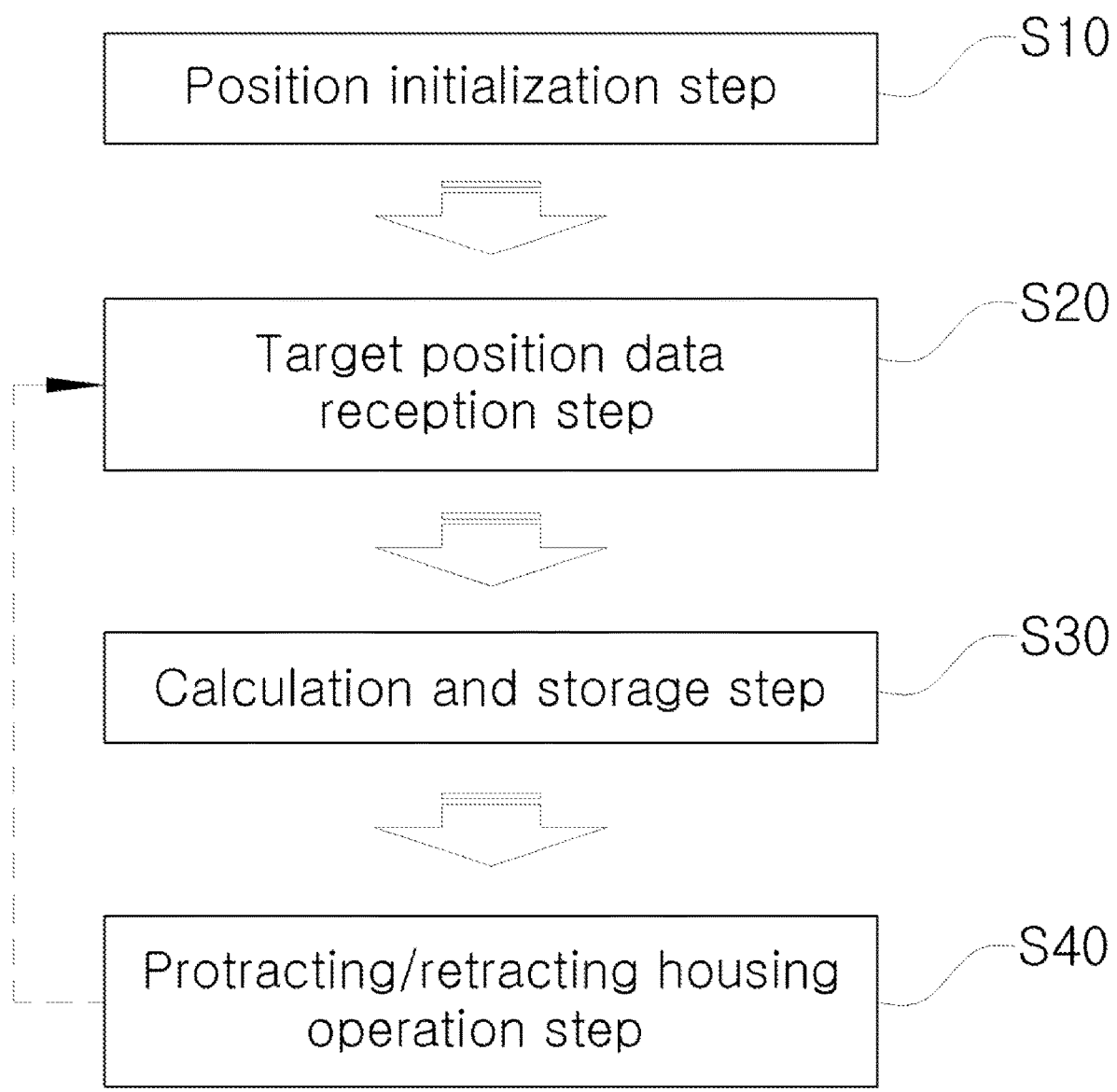
FIG. 10 is a block diagram schematically illustrating a method for controlling a stereoscopic screen device having a protracting/retracting structure by pixel according to an embodiment of the present invention.
Figure 11:
FIG. 11 is a block diagram illustrating a process of setting a starting point (zero point) of the protracting/retracting housing portion in the method for controlling the stereoscopic screen device.
Figure 11:
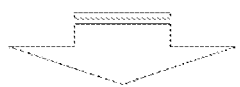
Figure 11:
Figure 12:
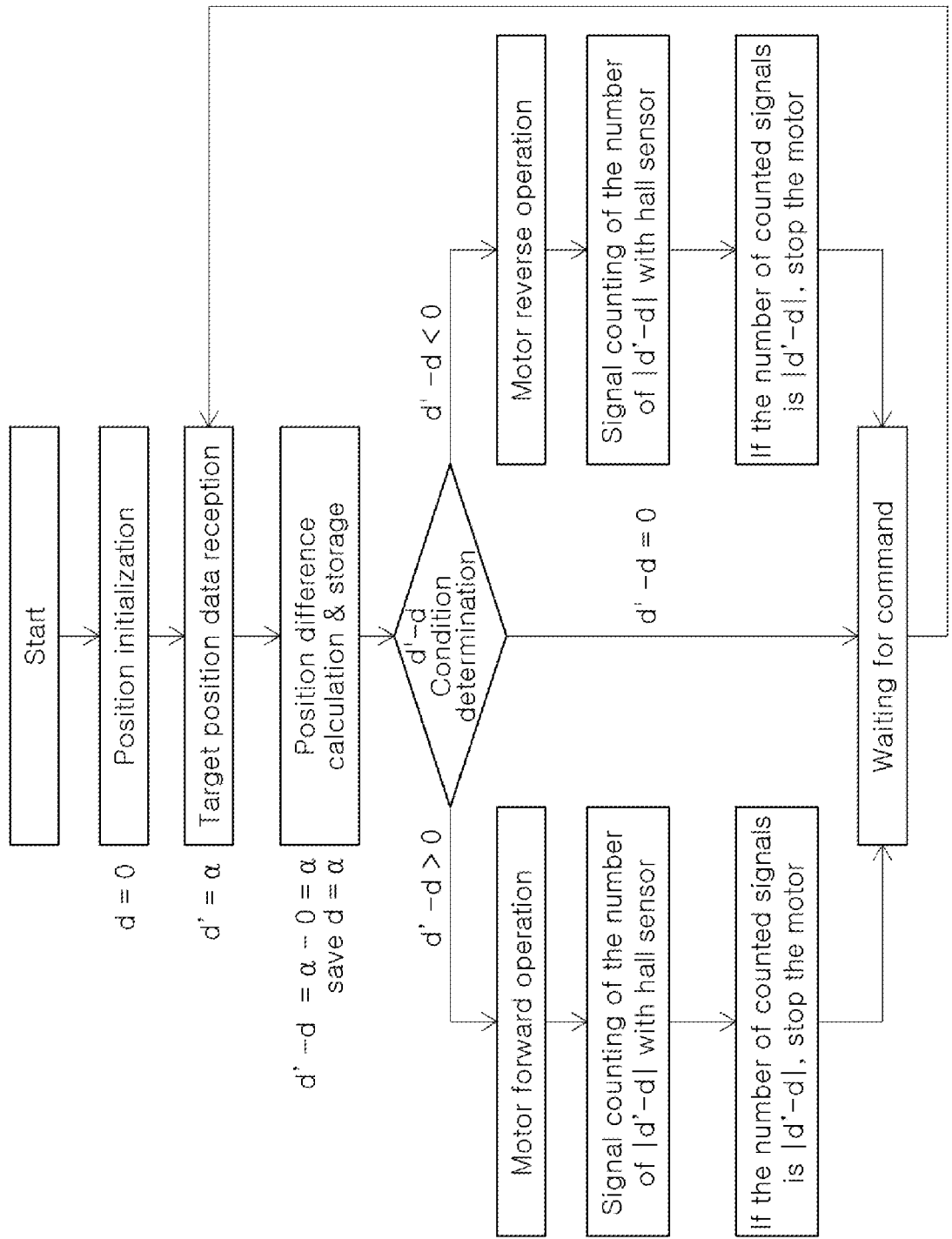
FIG. 12 is a control flow chart of a condition determination made in an operation stage of the protracting/retracting housing in the method for controlling the stereoscopic screen device.

FIG. 10 is a block diagram schematically illustrating a method for controlling a stereoscopic screen device having a protracting/retracting structure by pixel according to an embodiment of the present invention, FIG. 11 is a block diagram illustrating a process of setting a starting point (zero point) of the protracting/retracting housing portion in the method for controlling the stereoscopic screen device, and FIG. 12 is a control flow chart of a condition determination made in an operation stage of the protracting/retracting housing in the method for controlling the stereoscopic screen device.

The method for controlling a stereoscopic screen device having a protracting/retracting structure by pixel according to an embodiment of the present invention comprises a position initialization step (S10), a target position data reception step (S20), a calculation and storage step (S30), and a protracting/retracting housing operation step (S40).

1. Position Initialization Step (S10)

The position initialization step (S10) according to the present invention is a step to set all positions of the protracting/retracting housing portions 200 on the plurality of fixed housing portions 100 mounted in the slots 12 of the main board 10 to the same starting point (zero point) position, and is performed in the order illustrated in FIG. 11.

At the timepoint when the control module 110 is turned on, the motor 121 operates in a reverse direction to lower the protracting/retracting housing portion 200. When the lowest point of the protracting/retracting housing portion 200 is recognized by the low-point detection part 136, the motor 121 operates in the forward direction to lift upward the protracting/retracting housing portion 200. When the sensor 132 of the distance detection module 130 recognizes the uppermost detected piece 134, the motor stops, thereby completing the setting of the starting point (zero point) of the protracting/retracting housing portion 200.

2. Target Position Data Reception Step (S20)

The target position data reception step (S20) according to the present invention is a step in which, after zero setting of the protracting/retracting housing portion 200, the microprocessor of the control module 110 receives target position values from a computer in accordance with the movement distance of the protracting/retracting housing portion 200. The microprocess receives the movement distance of the protracting/retracting housing portion 200 as a numerical value.

3. Position Difference Calculation and Storage Step (S30)

The position difference calculation and storage step (S30) according to the present invention is a step that calculates the difference between the target position value and the current position value and stores the value as a movement command value. Here, the current position value refers to the position value of the protracting/retracting housing portion 200 at the time of receiving the target position value.

For example, if a target position value is '3' and a current position value is '1', a movement command value is calculated as '2' (3−1=2), and the motor 121 is driven forward. Additionally, if the target position value is '1' and the current position value is '3', the movement command value is calculated as '−2', and the motor 121 is driven in the reverse direction.

4. Protracting/Retracting Housing Operation Step (S40)

The protracting/retracting housing operation step (S40) according to the present invention is a step in which the protracting/retracting housing portion 200 by the forward and reverse driving of the motor 121 by calculating the current position and target position values.

Specifically, referring to the control flow diagram according to the three condition discriminations illustrated in FIG. 12, when the movement command value, which is the calculation value of the current and target position values, is greater than '0', the motor of the straight driving module 120 is operated in the forward direction to protrude the protracting/retracting housing portion 200. When the detection value of the distance detection module 130 and the movement command value match each other, the motor is turned off and the movement of the protracting/retracting housing portion 200 is stopped.

Moreover, if the movement command value is less than '0', the motor of the straight driving module 120 is operated in the reverse direction to return the protracting/retracting housing portion 200. When the detection value of the distance detection module 130 and the movement command value match each other, the motor is turned off and the movement of the protracting/retracting housing portion 200 is stopped.

For example, if the target position value is '3' and the current position value is '1', the movement command value is calculated as '2' (3−1=2). Because the movement command value is greater than '0', the motor 121 is driven forward. Similarly, if the target position value is '1' and the current position value is '3', the movement command value is calculated as '−2'. Since the movement command value is less than '0', the motor 121 is driven in reverse.

Moreover, after the above-mentioned protracting/retracting housing operation step (S40), when a new target position value is received in the target position data receiving step (S20), the protracting/retracting housing operation step (S40) is performed based on the value calculated by substituting the movement command value to the current position value of the target position data receiving step (S30).

That is, after renewing the position of the protracting/retracting housing portion 200 just before receiving the target position value in the target position data receiving step (S20) into the current position value, the renewed value is used as a reference value for controlling the protraction and retraction of the protracting/retracting housing portion 200.

Figure 13:
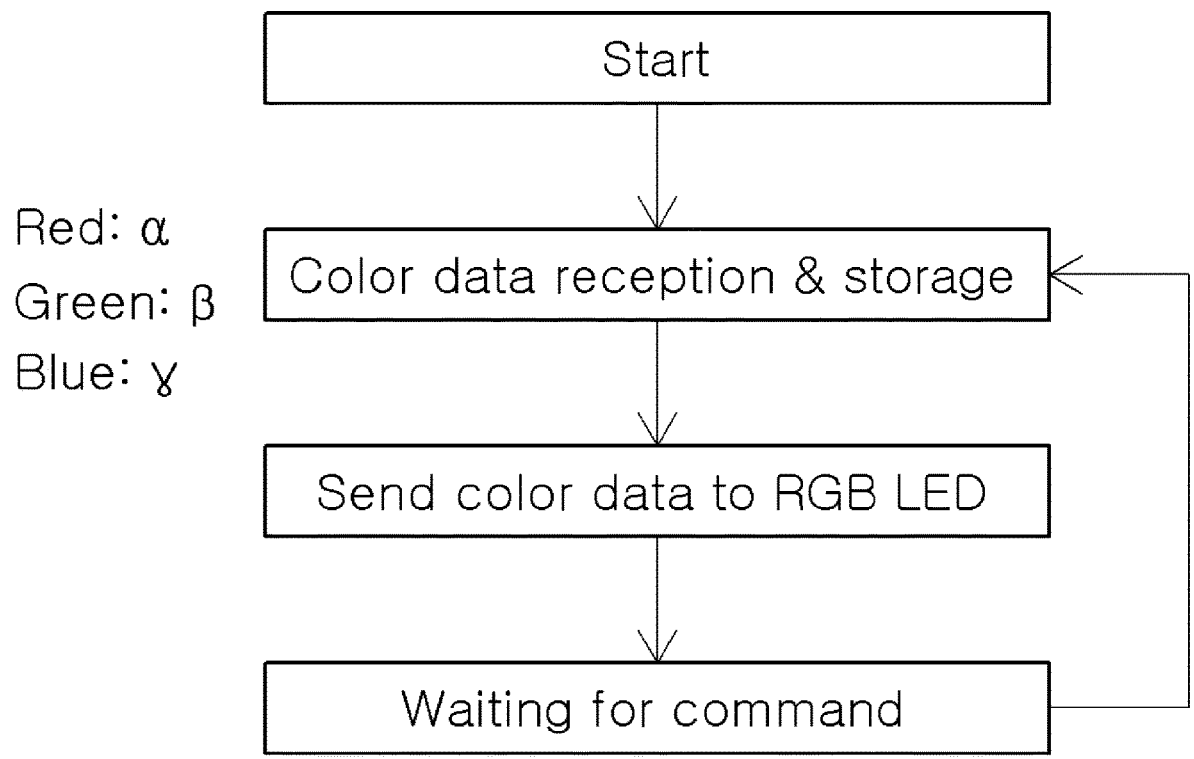
FIG. 13 is a flow chart schematically illustrating a method for controlling a visual information output portion of the stereoscopic screen device having a protracting/retracting structure by pixel.

FIG. 13 is a flow chart schematically illustrating a method for controlling a visual information output portion of the stereoscopic screen device. The control module 110 transmits the color data received from the computer to any one among the LED module 310, the LCD panel 320, and the OLED/QLED panel 330 of the visual information output portion 300, and outputs to the outside through the upper area of the protracting/retracting housing portion 200.

The visual information output portion 300 can be controlled independently of the operation of the protracting/retracting housing 200, thereby enabling the emission of light in accordance with the color data received from the computer, even when the protracting/retracting housings 200 composing the stereoscopic screen are at the zero position.

The above detailed description of the invention has been made with reference to the most desirable embodiments of the present invention. However, it should be understood that various modifications can be made without departing from the technical scope of the present invention. Therefore, the protection scope of the present invention should not be limited to the described embodiments, but should be recognized as covering the technologies in the following patent claims and equivalent technical means derived from these technologies.

INDUSTRIAL APPLICABILITY

The stereoscopic screen device having a protracting/retracting structure by pixel, and the method for controlling the same according to the present invention can realize the z-axis coordinates by the plurality of protracting/retracting housing portions which are linearly movable, are coupled to the plurality of fixed housing portions 100 arranged on the x and y-axis coordinate plane to be spaced apart from each other, and express light of various colors to the outside of each protracting/retracting housing portion, thereby providing visually dynamic, colorful, and stereoscopic information realized in x, y, z-axis coordinates. Therefore, the present invention is high in industrial applicability.

What is claimed is:

1. A stereoscopic screen device having a protracting/retracting structure by pixel, comprising:
a main board having N number of slots, wherein N is an integer not less than 2;
N number of fixed housing portions which are coupled to the N number of slots to form N number of pixel cells of a stereoscopic screen, respectively and independently from each other, wherein each of the N number of fixed housing portions includes, independently from each other, a straight driving module, a PCB mounted in one of the N number of slots, and a distance sensing module, wherein the N number of slots are formed on a main board;
N number of protracting/retracting housing portions (100) which are installed to surround the N number of fixed housing portions, respectively, wherein each of the N number of protracting/retracting housing portions (200) moves in coupling with the straight driving module, and is configured to detect a movement distance by the distance sensing module; and N number of visual information output portions each of which is configured to output color data transmitted from a computer to the upper area of each of the N number of protracting/retracting housing portions.

2. The stereoscopic screen device according to claim 1, further comprising:

N number of control modules for controlling the position of the N number of protracting/retracting housing portions by the straight driving module or for controlling the visual information output through the N number of visual information output portions, respectively, wherein the each of the N number of control modules is installed on the PCB or the main board, and includes a microprocessor, and a motor driver, wherein the microprocessor receives expression information from a computer, wherein the motor driver is installed on the PCB and controls the rotation direction of the motor.

3. The stereoscopic screen device according to claim 1, wherein the straight driving module includes a gear mount, a driving gear, a rack gear, and a slave gear, wherein the gear mount is installed in each of the N number of fixed housing portions, wherein the driving gear rotates by being connected to the axis of the motor, wherein the rack gear is installed in a longitudinal direction on one side of each of the N number of protracting/retracting housing portions, wherein the slave gear is installed on the gear mount and is engaged between the driving gear and the rack gear.

4. The stereoscopic screen device according to claim 1, wherein the distance detection module includes a sensor, point-type or line-type detected pieces, and a low-point detection part, wherein the sensor is installed in the fixed housing portion and connected to the control module, wherein the point-type or line-type detected pieces are arranged in a length direction of each of the N number of protracting/retracting housing portions corresponding to the sensor, wherein the low-point detection part detects the lowest height of the each of the N number of protracting/retracting housing portions to initialize position of each of the N number of protracting/retracting housing portions as an origin, and wherein the sensor detects a detection signal of a first detected piece to detect movement distance of each of the N number of protracting/retracting housing portions, and is configured to set a start position of each of the N number of protracting/retracting housing portions to be the same through the distance detection module.

5. The stereoscopic screen device according to claim 4, wherein the low-point detection part has a switch electrically connected to the control module on each of the N number of fixed housing portions, and is configured to physically contact the switch when each of the N number of protracting/retracting housing portions is lowered to the lowest height, or wherein the low-point detection part has a second detected piece and a second sensor, wherein the second detected piece is mounted at a lower portion of one side of each of the N number of protracting/retracting housing portions, wherein the second sensor which recognizes the second detected piece on the PCB at a position corresponding to the second detected piece when the each of the N number of protracting/retracting housing portions is located at the lowermost position.

6. The stereoscopic screen device according to claim 2, wherein each of the N number of visual information output portions is electrically connected to the control module and includes an LED module installed at the end portion of each of the N number of fixed housing portions which outputs an RGB light source.

7. The stereoscopic screen device according to claim 2, wherein each of the N number of visual information output portions includes at least one LCD panel, a backlight, a first image control board, and a first cable, wherein the LCD panel is formed on each of the N number of protracting/retracting housing portions, wherein the backlight is installed within each of the N number of protracting/retracting housing portions to output a light source toward the LCD panel, wherein the first image control board controls the LCD panel and the backlight, wherein one end of the first cable is connected to the first image control board and the other end of the first cable is connected to each of the N number of control modules to transmit an image signal and power.

8. The stereoscopic screen device according to claim 2, wherein the N number of visual information output portions includes at least one OLED/QLED panel, a second image control board, and second cable, wherein the OLED/QLED panel is formed on each of the N number of protracting/retracting housing portions, wherein the second image control board is installed within each of the N number of protracting/retracting housing portions to control the OLED/QLED panel, wherein one end of the second cable is connected to the second image control board and the other end of the second cable is connected to each of the N number control modules to transmit an image signal and power.

9. The stereoscopic screen device according to claim 7, wherein each of the N number of protracting/retracting housing portions is a tube having an opening hole formed at one end, wherein the LCD panel is installed in the opening hole.

10. The stereoscopic screen device according to claim 8, wherein each of the N number of protracting/retracting housing portions is a tube having an opening hole formed at one end, wherein the OLCD/QLED panel is installed in the opening hole.

11. A method for controlling a stereoscopic screen device having a protracting/retracting structure by pixel, comprising:

a position initialization step (S10) of setting a zero point (start point) of a protracting/retracting housing portion (200);

a target position data reception step (S20) in which, after setting the zero point of the protracting/retracting housing portion (200), a microprocessor receives a target position value according to a movement distance of the protracting/retracting housing portion (200) from a computer;

a position difference calculation and storage step (S30) of calculating the difference between the target position value and a current position value and storing the calculated value as a movement command value; and a protracting/retracting housing operation step (S40) in which, if the movement command value calculated by the current position and target position values is greater than '0', a motor of the straight driving module (120) operates forward to protract and retract the protracting/retracting housing portion (200) and the motor turns off to stop the movement of the protracting/retracting housing portion (200) when the detection value of the distance detection module (130) matches the moving command value, and if the moving command value is less than '0', the motor of the straight driving module (120) operates in reverse to return and move the protracting/retracting housing portion (200) and the motor turns off to stop the movement of the protracting/retracting housing portion (200) when the detection value of the distance detection module (130) matches the moving command value.

12. The method according to claim 11, wherein in the position initialization step (S10), at the timepoint when the control module (110) turns on, the motor (121) operates in reverse to lower the protracting/retracting housing portion (200), and when the lowest point of the protracting/retracting housing portion (200) is recognized by the low point detection part (136), the motor (121) operates forward to lift upward the protracting/retracting housing portion (200), and when the sensor (132) of the distance detection module (130) recognizes the uppermost detected piece (134), the motor stops to set the starting point of the protracting/retracting housing portion (200).

\* \* \* \* \*